(12) United States Patent
Xiao et al.

(10) Patent No.: US 8,527,575 B2
(45) Date of Patent: Sep. 3, 2013

(54) QUEUE PROCESSING SYSTEM

(75) Inventors: Hong Xiao, Acton, MA (US); Andre R. Turner, Belmont, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 265 days.

(21) Appl. No.: 12/971,828

(22) Filed: Dec. 17, 2010

(65) Prior Publication Data

US 2012/0158934 A1 Jun. 21, 2012

(51) Int. Cl.
*G06F 15/16* (2006.01)
*G06Q 50/00* (2012.01)

(52) U.S. Cl.
USPC ............................................. 709/200; 705/5

(58) Field of Classification Search
USPC ....................... 705/5; 709/217–219, 200–203
See application file for complete search history.

(56) References Cited

U.S. PATENT DOCUMENTS

| | | | | |
|---|---|---|---|---|
| 5,097,328 A * | 3/1992 | Boyette | | 348/150 |
| 5,978,770 A * | 11/1999 | Waytena et al. | | 705/5 |
| 6,023,681 A * | 2/2000 | Whitt | | 705/7.29 |
| 6,845,361 B1 * | 1/2005 | Dowling | | 705/5 |
| 7,284,061 B2 * | 10/2007 | Matsubayashi et al. | | 709/229 |
| 7,587,327 B2 * | 9/2009 | Jacobs et al. | | 705/7.14 |
| 7,847,686 B1 * | 12/2010 | Atkins et al. | | 340/539.13 |
| 7,990,266 B2 * | 8/2011 | Burnham et al. | | 340/539.13 |
| 2003/0093430 A1 * | 5/2003 | Mottur | | 707/10 |
| 2005/0089053 A1 * | 4/2005 | Zhu | | 370/412 |
| 2005/0278215 A1 * | 12/2005 | Seele, Jr. | | 705/14 |
| 2006/0095286 A1 * | 5/2006 | Kimura | | 705/1 |
| 2007/0042748 A1 * | 2/2007 | MacArthur | | 455/403 |
| 2007/0140222 A1 * | 6/2007 | Kowalczyk | | 370/352 |
| 2007/0233291 A1 * | 10/2007 | Herde et al. | | 700/91 |
| 2008/0046304 A1 * | 2/2008 | Dean | | 705/9 |
| 2008/0133283 A1 * | 6/2008 | Backer et al. | | 705/5 |
| 2009/0234729 A1 * | 9/2009 | Boss et al. | | 705/14 |
| 2010/0217610 A1 * | 8/2010 | Ang et al. | | 705/1.1 |
| 2011/0010220 A1 * | 1/2011 | Burnham et al. | | 705/9 |
| 2012/0158934 A1 * | 6/2012 | Xiao et al. | | 709/223 |

* cited by examiner

*Primary Examiner* — Brendan Higa

(57) ABSTRACT

A method, performed by a server device, may include receiving a request from a user device to place a user, associated with the user device, in a particular queue; determining whether the user meets one or more qualifications associated with the queue; placing the user in the particular queue, when the user meets the one or more qualifications; monitoring whether the user continues to meet the one or more qualifications, while the user is in the queue; and removing the user from the particular queue, when the user fails to meet the one or more qualifications.

18 Claims, 11 Drawing Sheets

QUEUE PROCESSING SYSTEM

BACKGROUND INFORMATION

Many interactions between customers and businesses are associated with queues. For example, when a customer goes to a restaurant to eat a meal, goes to a government office to pay a fee, or goes to a visit a doctor, the customer may have to wait in a queue with other customers. Often, the customer may not know or be given an estimate about how long the customer may need to wait before being served. Furthermore, the customer may need to remain in the vicinity of the business or office to secure a place in the queue. Waiting in queues may be an unpleasant experience for the customer.

DETAILED DESCRIPTION OF PREFERRED EMBODIMENTS

Figure 1:
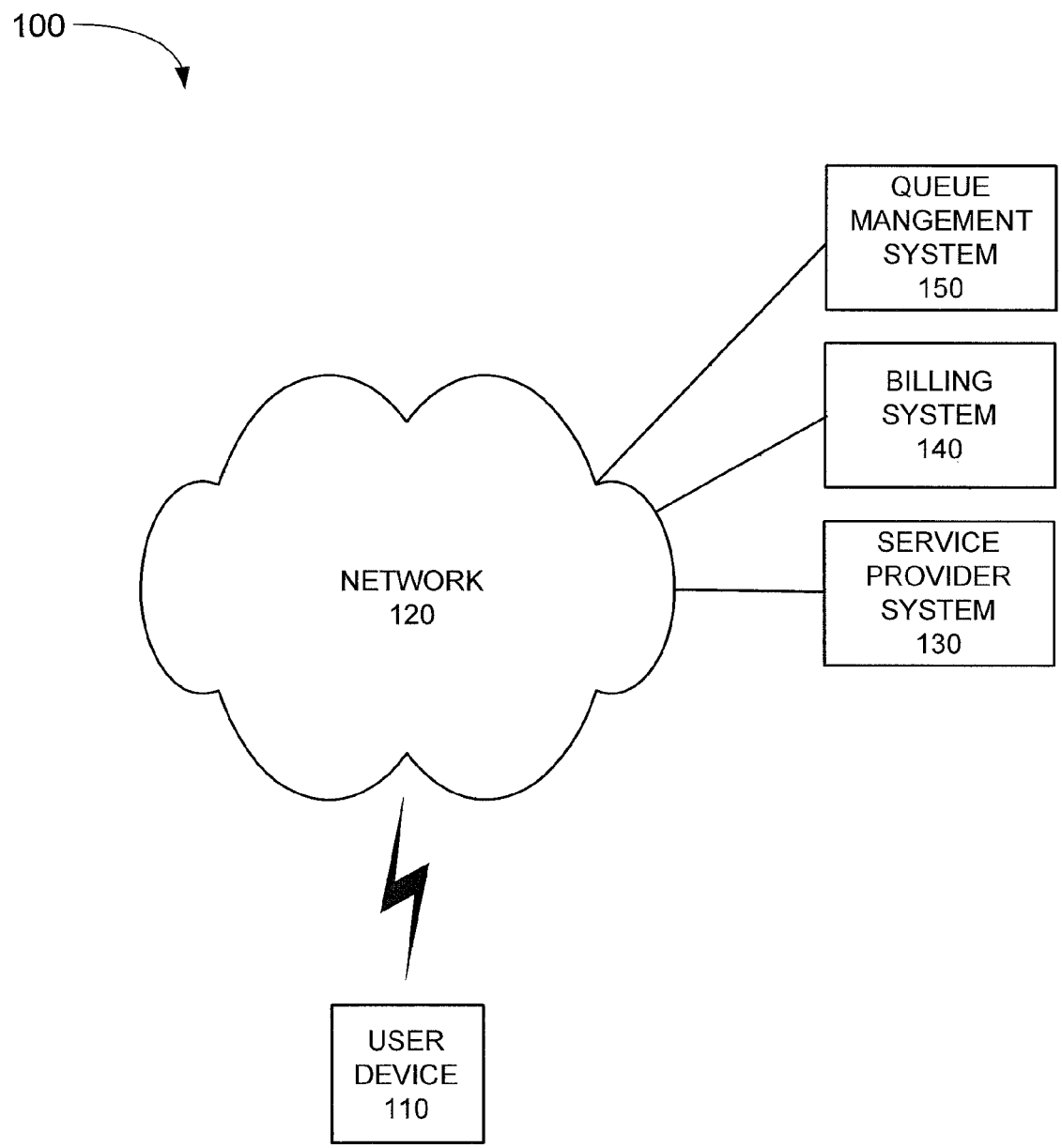
FIG. 1 is a diagram illustrating an example of components of a system according to an implementation described herein.

The following detailed description refers to the accompanying drawings. The same reference numbers in different drawings identify the same or similar elements. Also, the following detailed description does not limit the invention.

An implementation described herein may relate to an automatic wireless queue system. In one example, a user may use a wireless communication device (e.g., a mobile phone) to identify a queue associated with a business, government office, and/or another type of entity, and request to be placed in the queue. A queue management system may determine whether the user is qualified to be placed in the queue. For example, the user may need to be within a particular distance of a location associated with the queue; the user may not be in another queue at the same time; the user's estimated arrival time may need to be less than a threshold time; and/or the user may need to have an appointment, membership, and/or an account associated with the queue. If the user is qualified to be placed in the queue, the queue management system may place the user in the queue and may monitor whether the user continues to be qualified to be in the queue. For example, if the user moves outside the particular distance, the user may be removed from the queue. The queue management system may also monitor an expected arrival time and an expected service time for the user. If the expected arrival time is estimated to be later than the expected service time, the queue management system may move the user down the queue. The queue management system may provide updates to the user while the user is in the queue, such as, for example, an estimated time until the user is serviced.

An implementation described herein may further relate to a mobile device identifier component that is associated with a location associated with a queue. When a user, carrying a mobile communication device, moves into an area within a particular distance of the mobile device identifier component, the mobile device identifier component may detect the mobile communication device and may contact the mobile communication device to determine if the user would like to be placed in the queue.

An implementation described herein may further relate to receiving an indication of a delay in service for a particular queue. The queue management system may receive the indication of delay, may estimate a delay in service based on the received indication, may adjust the queue based on the estimated delay, and may inform the users in the queue about the estimated delay. For example, a doctor may be delayed by a complication, resulting in a delay of one hour. The queue management system may move appointments of users associated with a queue to see the doctor and may inform the users in the queue about the delay.

An implementation described herein may further relate to synchronizing a calendar application with a queue application. For example, a user may enter a calendar event using a calendar application and may indicate that the calendar event is associated with a particular queue. The queue application may detect that the calendar event is upcoming and may contact the queue management system to place the user in the particular queue associated with the calendar event.

An implementation described herein may further relate to enabling two users to switch positions in a queue. A first user may request to move up or down a queue and the queue management system may forward the request to other users in the queue. If a second user agrees to switch positions with the first user, the queue management system may switch the first user's position with the second user's position in the queue. Furthermore, the first user may make an offer to pay a particular amount to move up in the queue. If the second user agrees to switch positions with the first user, the queue management system may contact a billing system to transfer the particular amount from an account associated with the first user to an account associated with the second user.

A "queue," as the term is used herein, may refer to any data structure that organizes users based, for example, on a first-in, first-out basis and is associated with a particular business, government office, and/or another type of entity that provides a service to users in the queue in the order in which they are organized in the queue.

FIG. 1 is a diagram of a system 100 according to an implementation described herein. As shown in FIG. 1, system 100 may include a user device 110, a network 120, a service provider system 130, a billing system 140, and a queue management system 150.

User device 110 may include any communication device capable of communicating with network 120, such as a mobile communication device, a personal digital assistant (PDA), or a media playing device with communication capabilities; a desktop device, such as a personal computer or a workstation; a laptop computer; a telephone terminal; or any other communication device or combinations thereof. In one example, user device 110 may include a mobile communication device, such as a mobile phone, a personal digital assistant (PDA), or a media playing device with communication capabilities; a desktop device, such as a personal computer or a workstation; a laptop computer; a telephone terminal; or any other communication device or combinations thereof.

Network 120 may include a circuit-switched network and/or a packet-switched network, such as, for example, a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks.

Service provider system 130 may include one or more devices (e.g., server devices) that are associated with a business, government office, and/or a service provider that includes a queue. For example, service provider system 130 may include a queue management device for a restaurant, government office (e.g., department of motor vehicles), a medical office, a bank teller, a car repair shop, and/or any other business, office, and/or another type of entity where customers may have to wait in a queue before being served. While FIG. 1 illustrates one service provider system 130 for simplicity, in practice, system 100 may include multiple, and possibly a large number of, service provider systems 130. In one example, service provider system 130 may delegate some or all queue management functions to queue management system 150. In another example, service provider system 130 may not delegate queue management functions to queue management system 150. In yet another example, service provider system 130 may coordinate queue management functions with queue management system 150.

Billing system 140 may include one or more devices (e.g., server devices) that manage an account associated with user device 110. For example, billing system 140 may be associated with a service provider that provides access for user device 110 to network 120 (e.g., a provider of mobile communication services).

Queue management system 150 may include one or more devices (e.g., server devices) that manage queues associated with user device 110. For example, queue management system 150 may receive a request from user device 110 to be placed in a queue associated with service provider system 130, may determine whether the user is qualified to be placed in the particular queue, and may place the user in the particular queue if the user is qualified. Queue management system 150 may inform service provider system 130 that the user has been placed in the queue associated with service provider system 130. Queue management system 150 may receive information from service provider system 130 about the queue and may forward the information to user device 110. Queue management system 150 may monitor the queue and the user and may determine whether the user continues to be qualified to be in the queue. For example, if the user moves too far away from a location associated with service provider system 130 (e.g., further than a threshold distance), queue management system 150 may remove the user from the queue.

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100.

Figure 2:
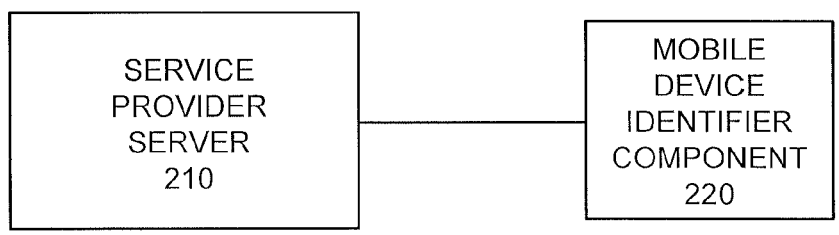
FIG. 2 is a diagram illustrating example components of a service provider system according to an implementation described herein.

FIG. 2 is a diagram illustrating example components of service provider system 130. As shown in FIG. 2, service provider system 130 may include a service provider server 210 and a mobile device identifier component 220.

Service provider server 210 may manage a queue associated with a place of business, government office, or another type of service. Service provider server 210 may communicate with user device 110 via mobile device identifier component 220. Mobile device identifier component 220 may detect that user device 110 is within a particular distance of mobile device identifier component 220. For example, mobile device identifier component 220 may be located in a place of business or office associated with service provider system 130 and may detect when a user carrying user device 110 walks into the place of business or office. Mobile device identifier component 220 may identify user device 110 based on one or more identifiers associated with user device 110 and may provide information to service provider server 210 about the identified user device 110.

Service provider server 210 may generate a message, inquiring whether a user associated with user device 110 would like to be placed in a queue associated with service provider system 130, and may send the generated message to user device 110 wirelessly via mobile device identifier component 220 (or via another wireless transceiver). Service provider server 210 may receive a response from user device 110, via mobile device identifier component 220 (or via another wireless transceiver) indicating whether the user of user device 110 would like to be placed in the queue. Service provider server 210 may place the user in the queue and may communicate updates about the user's status in the queue to the user via user device 110.

Although FIG. 2 shows example components of service provider system 130, in other implementations, service provider system 130 may include fewer components, different components, differently arranged components, and/or additional components than those depicted in FIG. 2. Alternatively, or additionally, one or more components of service provider system 130 may perform one or more tasks described as being performed by one or more other components of service provider system 130.

Figure 3:
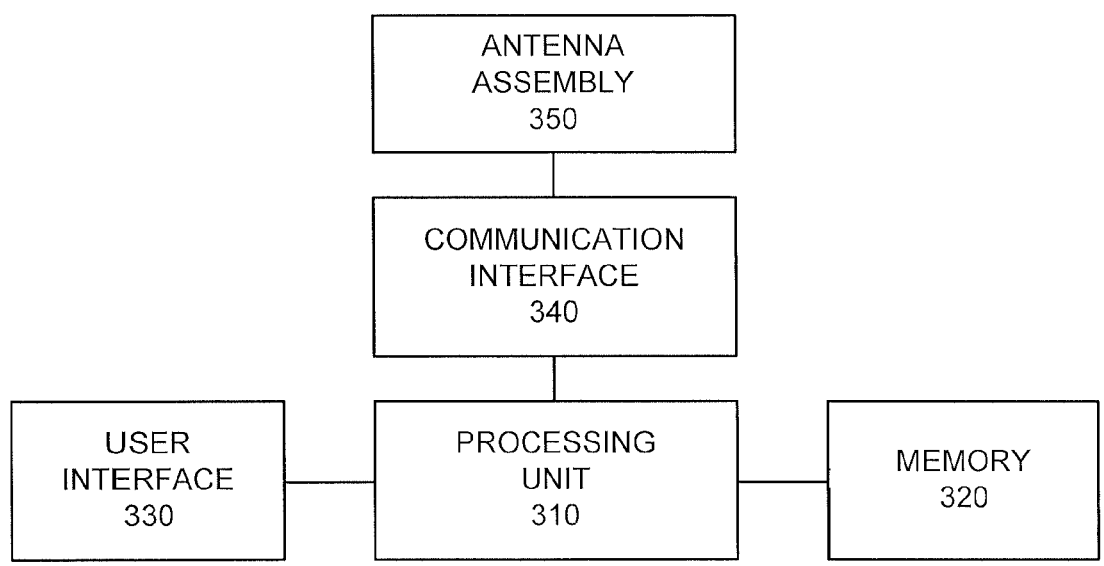
FIG. 3 is a diagram illustrating example components of a wireless device according to an implementation described herein.

FIG. 3 is a diagram illustrating example components of a wireless device 300 according to an implementation described herein. In one example, wireless device 300 may correspond to user device 110. Additionally or alternatively, wireless device 300 may correspond to mobile device identifier component 220. For example, user device 110 and/or mobile device identifier component 220 may each include one or more wireless devices 300. As shown in FIG. 3, wireless device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), or the like. Processing unit 310 may control operation of wireless device 300 and its components.

Memory 320 may include a random access memory (RAM), a read only memory (ROM), and/or another type of memory to store data and instructions that may be used by processing unit 310.

User interface 330 may include mechanisms for inputting information to wireless device 300 and/or for outputting information from wireless device 300. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, or keys of a keypad) to permit data and control commands to be input into wireless device 300; a display to output visual information; and/or a vibrator to cause wireless device 300 to vibrate.

Communication interface 340 may include any transceiver-like mechanism that enables wireless device 300 to communicate with other devices and/or systems. For example, communication interface 340 may include a modem or an Ethernet interface to a LAN. Communication interface 340 may also include mechanisms for communicating via a wireless network, such as network 120. For example, communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air and receive RF signals over the air and provide them to communication interface 340.

As described herein, wireless device 300 may perform certain operations in response to processing unit 310 executing software instructions contained in a computer-readable medium, such as memory 320. A computer-readable medium may be defined as a non-transitory memory device. A memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of wireless device 300, in other implementations, wireless device 300 may include fewer components, different components, differently arranged components, or additional components than depicted in FIG. 3. Additionally or alternatively, one or more components of wireless device 300 may perform the tasks described as being performed by one or more other components of wireless device 300.

Figure 4:
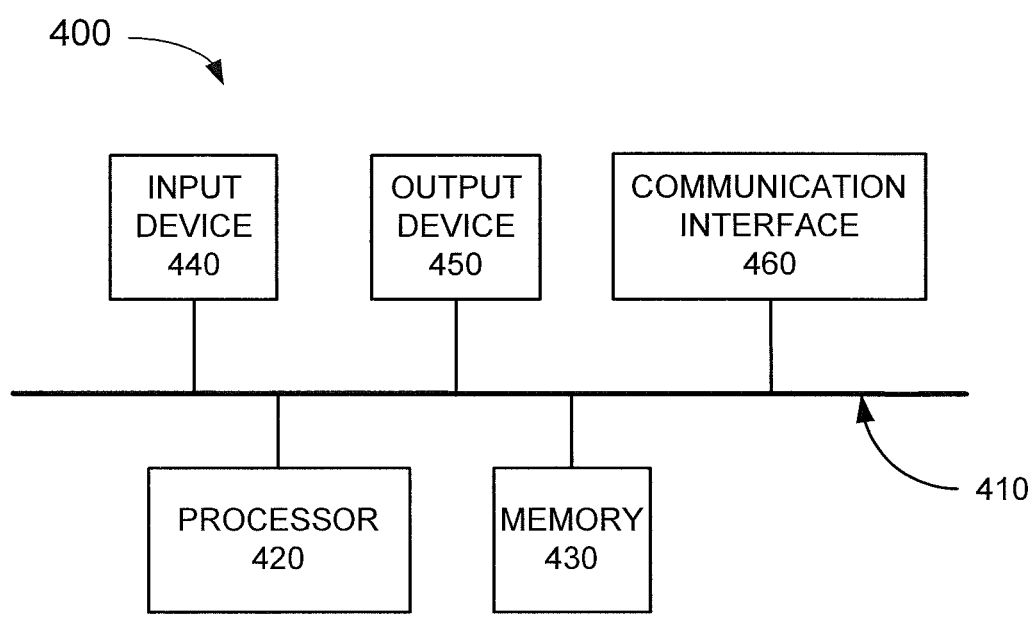
FIG. 4 is a diagram of example functional components of a server device according to an implementation described herein.

FIG. 4 is a diagram illustrating example components of a server device 400 according to a first implementation described herein. In one example, server device 400 may correspond to queue management system 150. Additionally or alternatively, server device 400 may correspond to service provider server 210. For example, queue management system 150 and/or service provider server 210 may each include one or more server devices 400. As shown in FIG. 4, server devices 400 may include a bus 410, a processor 420, a memory 430, an input device 440, an output device 450, and a communication interface 460.

Bus 410 may include a path that permits communication among the components of server device 400. Processor 420 may include one or more processors, microprocessors, or processing logic (e.g., ASICs or FPGAs) that may interpret and execute instructions. Memory 430 may include a RAM device or another type of dynamic storage device that may store information and instructions for execution by processor 420, a ROM device or another type of static storage device that may store static information and instructions for use by processor 420, a magnetic and/or optical recording memory device and its corresponding drive, and/or a removable form of memory, such as a flash memory.

Input device 440 may include a mechanism that permits an operator to input information to server device 400, such as a keypad, a keyboard, a button, or an input jack for an input device such as a keypad or a keyboard, etc. Output device 450 may include a mechanism that outputs information to the operator, including one or more light indicators, a display, a speaker, etc.

Communication interface 460 may include any transceiver-like mechanism that enables server device 400 to communicate with other devices and/or systems. For example, communication interface 460 may include a modem, a network interface card, and/or a wireless interface card.

As will be described in detail below, server device 400 may perform certain operations. Server device 400 may perform these operations in response to processor 420 executing software instructions stored in a computer-readable medium, such as memory 430.

The software instructions may be read into memory 430 from another computer-readable medium, or from another device via communication interface 460. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of server device 400, in other implementations, server device 400 may include fewer components, different components, additional components, or differently arranged components than depicted in FIG. 4. Additionally or alternatively, one or more components of server device 400 may perform one or more tasks described as being performed by one or more other components of server device 400.

Figure 5A:
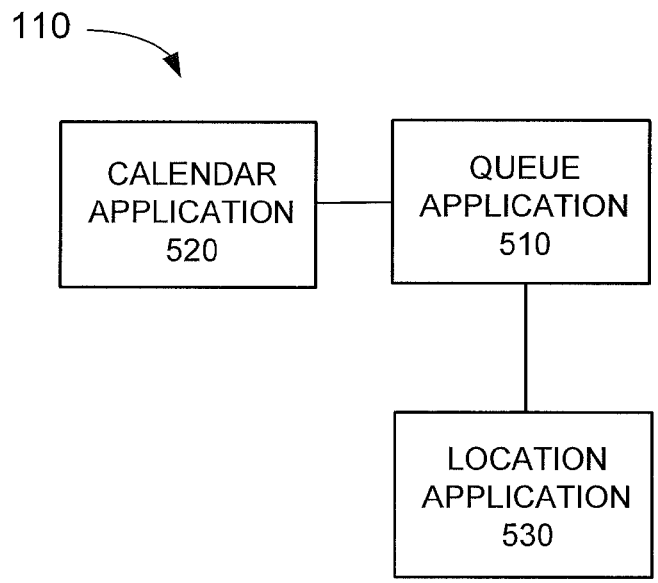
FIG. 5A is a diagram of example functional components of a user device according to an implementation described herein.

FIG. 5A is a diagram of example functional components of user device 110 according to an implementation described herein. As shown in FIG. 5A, user device 110 may include a queue application 510, a calendar application 520, and a location application 530.

Queue application 510 may communicate with queue management system 150 to manage queues for the user associated with user device 110. For example, queue application 510 may send a request to queue management system 150 to place the user in a particular queue and may receive updates about the particular queue from queue management system 150. Queue application 510 may display messages, received from queue management system 150, to the user via user interface 330. Queue application 510 may also receive indications of an upcoming calendar event from calendar application 510, may determine whether the upcoming calendar event is associated with a particular queue, and may send a request to queue management system 150 to place the user in the particular queue in response to determining the upcoming calendar event.

Calendar application 520 may manage calendar events. For example, calendar application 520 may store a calendar event recorded by the user and may provide information about the calendar event to queue application 510. Location application 530 may determine a location associated with user device 110. In one example, location application 530 may identify a geographic location of user device 110 based on a signals received by a Global Positioning System (GPS) receiver associated with user device 110. Location application 530 may provide information about the location to queue application 510.

Although FIG. 5A shows example functional components of user device 110, in other implementations, user device 110 may include fewer functional components, different functional components, differently arranged functional components, or additional functional components than depicted in FIG. 5A. Additionally or alternatively, one or more functional components of user device 110 may perform one or more tasks described as being performed by one or more other functional components of user device 110.

Figure 5B:
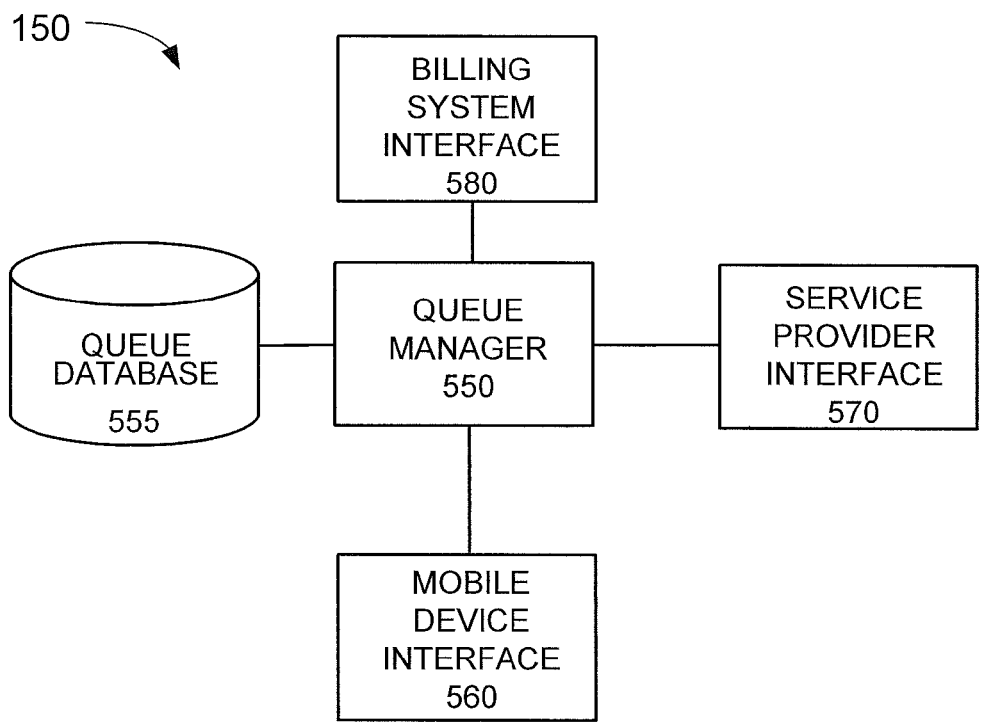
FIG. 5B is a diagram of example functional components of a queue management system according to an implementation described herein.

FIG. 5B is a diagram of example functional components of queue management system 150 according to an implementation described herein. As shown in FIG. 5B, queue management system 150 may include a queue manager 550, a queue database 555, a mobile device interface 560, a service provider interface 570, and a billing system interface 580.

Queue manager 550 may manage queues associated with one or more service provider system 130. Queue manager 550 may receive a request from user device 110 to place a user, associated with user device 110, in a queue associated with a particular service provider system 130. Queue manager 550 may determine whether the user is qualified to be placed in the particular queue and may place the user in the particular queue if the user is qualified to be placed in the particular queue. For example, the user may need to be within a particular distance of a location associated with the particular queue (e.g., within 2 miles of a restaurant). Queue manager 550 may monitor the user at particular intervals to determine if the user continues to qualify to be in the queue. For example, if the user moves too far away from the location associated with the queue, the user may be removed from the queue.

Queue database 555 may store information associated with queues managed by queue management system 150. Example fields that may be stored in queue database 555 are described below with reference to FIG. 6.

Mobile device interface 560 may communicate with user device 110. For example, mobile device interface 560 may receive a request from user device 110 to place the user in a particular queue and may forward the received message to queue manager 550. Mobile device interface 560 may also receive a message from queue manager 550 for user device 110, may transform the message to a format compatible with user device 110, and may transmit the transformed message to user device 110 via network 120.

Service provider interface 570 may communicate with service provider system 130. For example, service provider interface 570 may receive a message from queue manager 550, may transform the message to a format compatible with service provider system 130, and may transmit the transformed message to service provider system 130. Service provider interface 570 may also receive information from service provider system 130, such as information about a particular user being served, indicating to queue manager 550 that queue manager 550 should remove the user from the queue associated with service provider system 130.

Billing system interface 580 may communicate with billing system 140. For example, billing system interface 580 may receive a message from queue manager 550, may transform the message to a format compatible with billing system 140, and may transmit the transformed message to billing system 140. The message may include, for example, information identifying a first user, information identifying a second user, and an amount that is to be transferred from an account associated with the first user to an account associated with the second user. Billing system interface 580 may receive a confirmation message from billing system 140, indicating that a transfer has been successfully carried out.

In one example, being put in a queue, being moved within a queue, and/or being removed from a queue could be associated with a fee. For example, in order to be placed into a queue, to be moved in a queue, and/or to be removed from a queue, a user may have to pay a fee and billing system interface 580 may forward information about the user being placed into a queue to billing system 140.

Although FIG. 5B shows example functional components of queue management system 150, in other implementations, queue management system 150 may include fewer functional components, different functional components, differently arranged functional components, or additional functional components than depicted in FIG. 5B. Additionally or alternatively, one or more functional components of queue management system 150 may perform one or more tasks described as being performed by one or more other functional components of queue management system 150.

Figure 6:
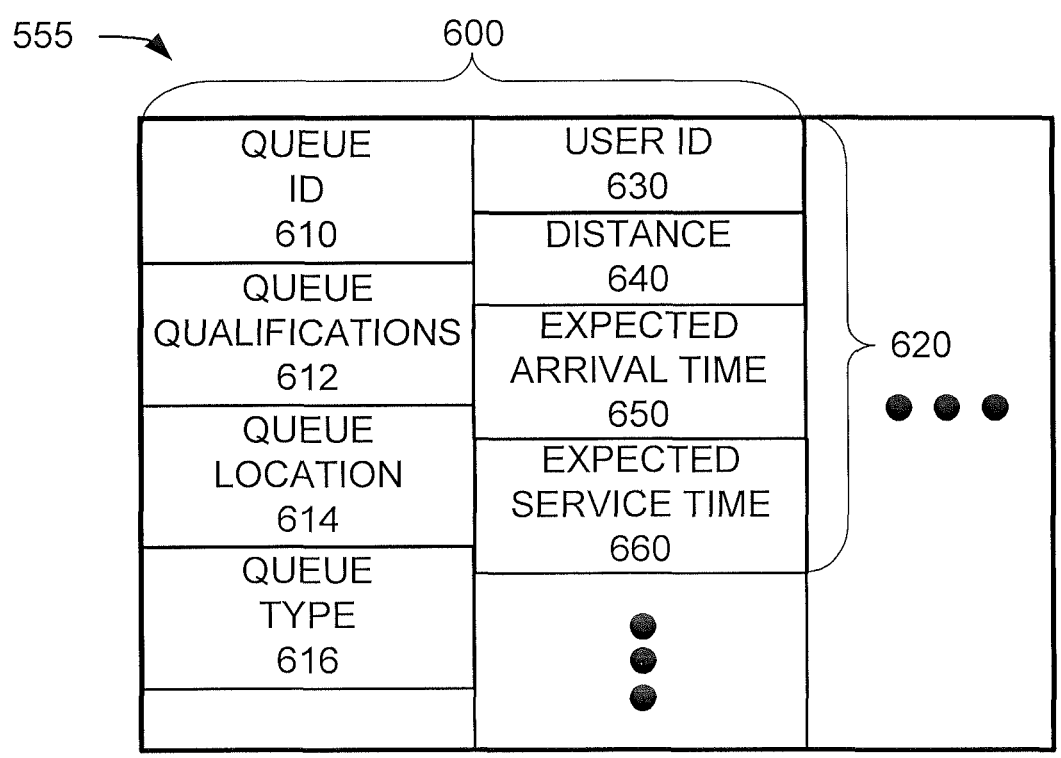
FIG. 6 is a diagram of example fields that may be stored in a queue database according to an implementation described herein.

FIG. 6 is a diagram of example fields that may be stored in queue database 555 according to an implementation described herein. In one implementation, queue database 555 may be implemented in a storage device included as part of memory 420. In another implementation, queue database 555 may be stored in a memory associated with another device or a group of devices, separate from or including memory 420. As shown in FIG. 6, queue database 555 may include one or more queue records 600 (referred to herein collectively as "queue records 600" and individually as "queue record 600"). Queue record 600 may include a queue identification (ID) field 610, a queue qualifications field 612, a queue location 614, a queue type field 616, and one or more user records 620 (referred to herein collectively as "user records 620" and individually as "user record 620").

Queue ID field 610 may store an identifier that uniquely identifies a particular queue. Additionally and or alternatively, queue ID field 610 may store information about service provider system 130 associated with the particular queue and/or about a business, organization or another type of entity associated with the queue. For example, queue ID field 610 may store a location associated with the business, organization, or another type of entity.

Queue qualifications field 612 may store information about qualifications associated with the particular queue. For example, queue qualifications field 612 may store a requirement that must be met in order for the user to be placed in the queue, such as that the user needs to be within a particular distance of a location associated with the queue; that the user may not be in another queue of a same type at the same time; that the user's estimated arrival time needs to be less than a threshold time; and/or that the user needs to have an appointment, membership, and/or an account associated with the queue.

Queue location field 614 may store information about a location associated with the particular queue. For example, queue location field 614 may store information about a location of a business, government office, or another type of entity associated with the particular queue. The information about the location may be in the form of Global Positioning System (GPS) coordinates, a street address, coordinated in a hierarchical grid, and/or any other format used to determine a geographic location.

Queue type field 616 may store information identifying a queue type associated with the particular queue. For example, queue type field may store information identifying the particular queue as a restaurant queue, as a medical queue, as a government queue, as a telephone queue, and/or any other possible type of queue. Information in queue type field 616 may be used if a user qualification includes a requirement that a user may not be in another queue of a same type. For example, if a user is already in a restaurant queue, the user may not qualify to be placed in a queue associated with another restaurant.

User records 620 may store information about users that are in the particular queue. For example, queue record 600 may include a user record 620 for each particular user that is in the particular queue associated with queue record 600. User record 620 may include a user ID field 630, a distance field 640, an expected arrival time field 650, and an expected service time field 660.

User ID field 630 may store an identifier that uniquely identifies a particular user. For example, user ID field 630 may store a user's name and/or subscription number associated with a subscription (e.g., a subscription associated with providing access to user device 110 to network 120). Additionally or alternatively, user ID field 630 may store information identifying user device 110. For example, user ID field 630 may store information identifying user device 110, such as an Internet Protocol (IP) address assigned to user device 110 by network 120, an International Mobile Equipment Identity (IMEI) associated with user device 110, a Mobile Identification Number (MIN) associated with user device 110, a Mobile Subscriber International Subscriber Directory Number (MSISDN) associated with user device 110, and/or a Globally Unique Temporary Identifier (GUTI) associated with user device 110.

Distance field 640 may store information about a distance of user device 110 from the location stored in queue location field 614. The distance may be computed based on location information received from user device 110. Expected arrival time field 650 may store information about an expected arrival time of the user from the user's location to the location associated with the queue. The expected arrival time may be estimated based on several factors, such as, for example, the user's current moving speed (e.g., based on two location positions determined over a period of time), based on determined traffic conditions between the user's location and the location associated with the queue, based on estimated traffic conditions (e.g., estimated based on day of week and time), etc. Expected service time field 660 may store information about the expected time at which the user may be served, based on, for example, the user's position in the queue and based on an average amount of service time between two consecutive users in the queue.

Although FIG. 6 shows example fields that may be stored in queue database 555, in other implementations, queue database 555 may include fewer fields, different fields, differently arranged fields, and/or additional fields than depicted in FIG. 6.

Figure 7A:
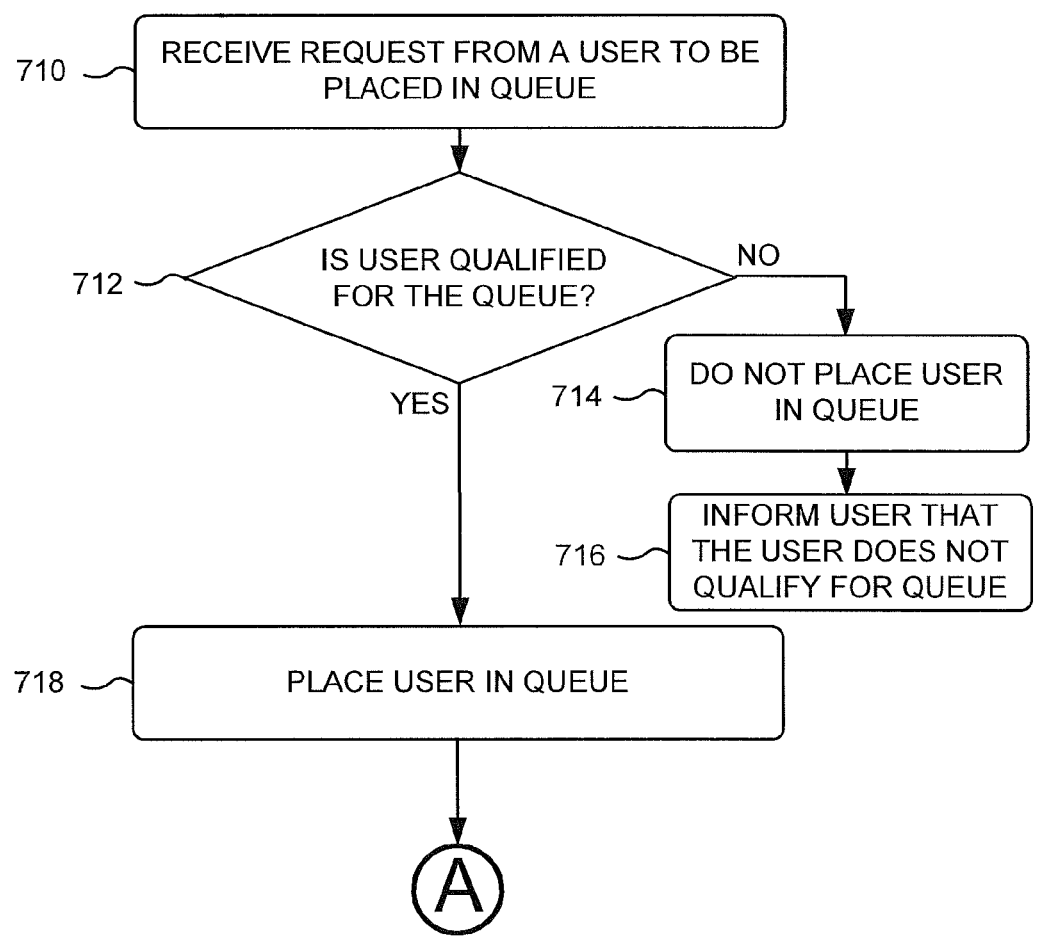
FIGS. 7A-7C are flow diagrams illustrating a process for managing a user's place in a queue according to an implementation described herein.
Figure 7B:
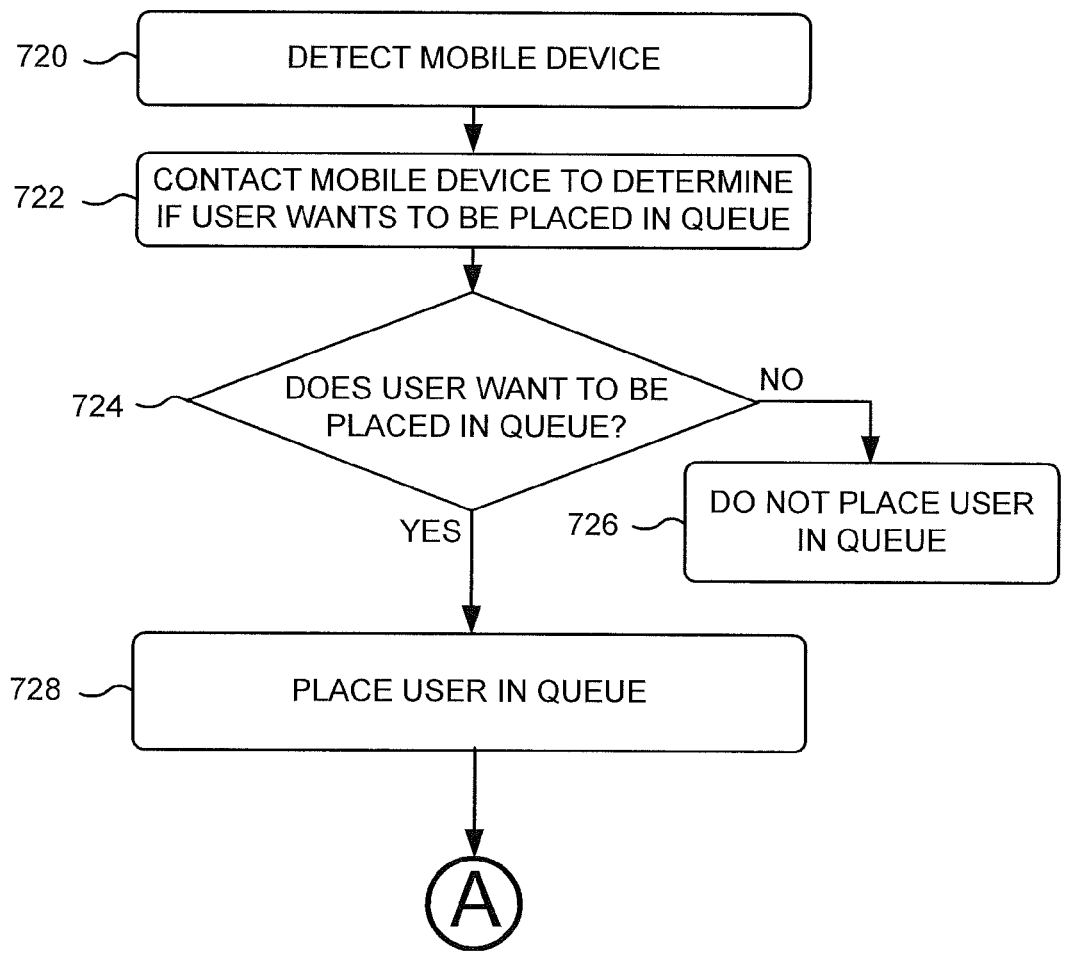
Figure 7C:
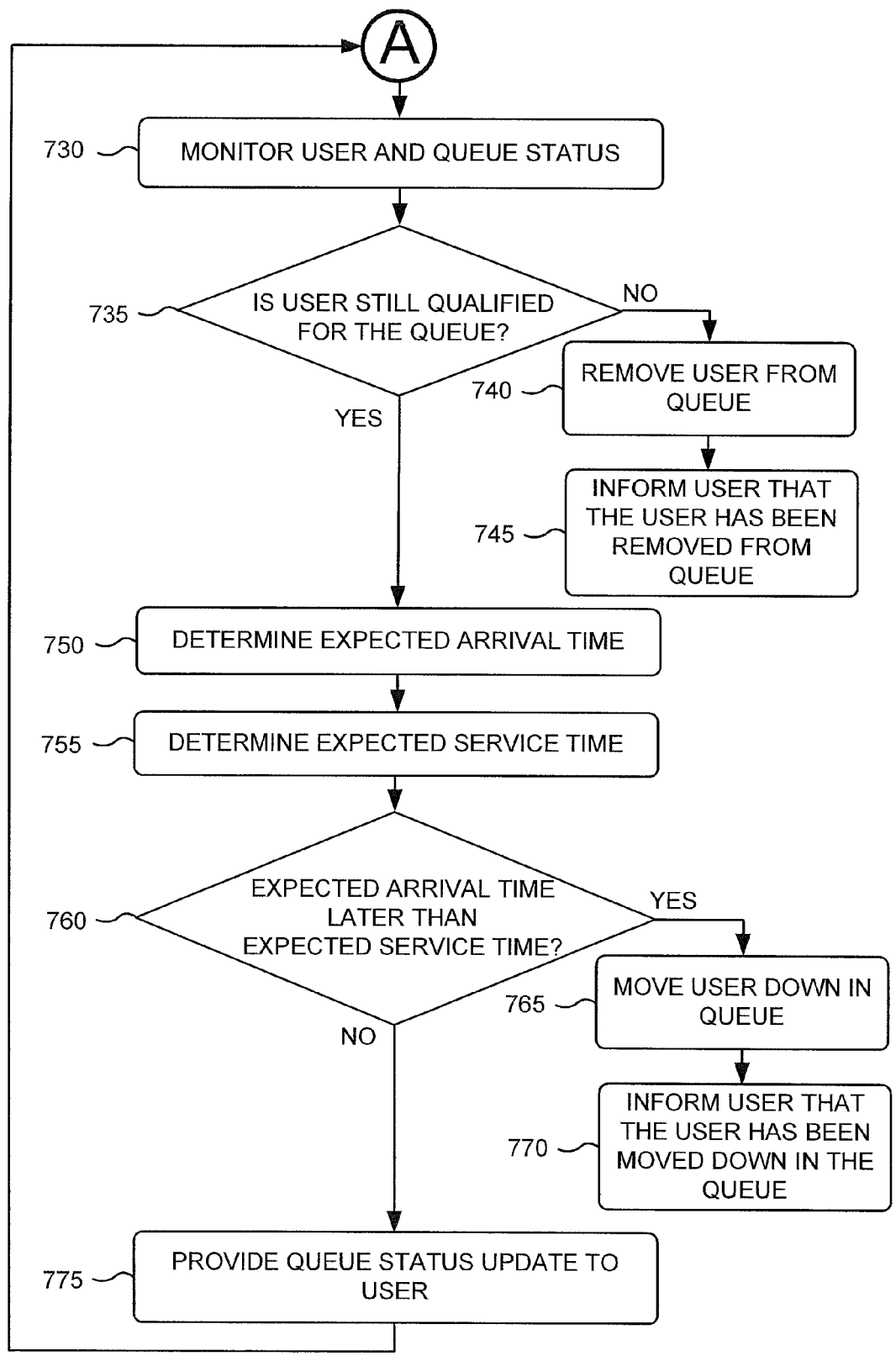

FIGS. 7A-7C are flow diagrams illustrating a process for managing a user's place in a queue according to an implementation described herein. In one implementation, the process of FIGS. 7A-7C may be performed by queue management system 150 and/or service provider system 130. In other implementations, some or all of the process of FIGS. 7A-7C may be performed by another device or a group of devices separate from and/or possibly remote from queue management system 150 and/or service provider system 130 and/or including queue management system 150 and/or service provider system 130.

FIG. 7A illustrates a first example of how a user may be placed in a queue. In the process of FIG. 7A, a request to be placed in a queue is initiated by the user. The process of FIG. 7A may include receiving a request from a user to be placed in a queue (block 710). For example, a user of user device 110 may activate queue application 510. Queue application 510 may obtain the location of user device 110 from location application 530 and may send a request to queue management system 150 for a location of available queues within a particular distance of the location of user device 110. Additionally or alternatively, the user may enter a name, a queue type, or other information identifying a business, government office, or a another type of entity associated with a queue and may send a request to queue management system 150 to be placed in a queue associated with the entered name. Queue manager 550 may access queue database 555 and may identify one or more queues based on the received request. Mobile device interface 560 may forward a list of identified queues to user device 110 and may receive a selection from user device 110 of one of the identified queues.

A determination may be made as to whether a user is qualified for the queue (block 712). For example, queue manager 550 may determine one or more qualifications associated with the selected queue. The qualifications may include one or more of whether the user is within a particular distance of a location associated with the queue; whether the user is in another queue of a same type at a same time; whether an estimated arrival time of the user is longer than a threshold; whether the user has an appointment, membership, and/or an account associated with a business, government office, or another type of entity associated with the queue; and/or any other qualification that may be used to determine whether the user is qualified to be placed in the queue. Queue manager 550 may obtain information about whether the user meets the one or more qualifications from user device 110 and/or from service provider system 130. For example, queue manager 550 may receive a location of user device 110 from user device 110 and a location associated with the queue from service provider system 130 and may determine whether user device 110 is within a particular distance of the location associated with the queue. For example, a user may not be able to be placed in a queue for a meal at a restaurant if the user is more than 5 miles away from the restaurant.

If it is determined that the user is not qualified for the queue (block 712—NO), the user may not be placed in the queue (block 714) and the user may be informed that the user does not qualify for the queue (block 716). For example, queue manager 550 may not place the user in the queue and mobile device interface 560 may send a message to user device 110, informing the user that the user does not qualify to be placed in the queue and that the user has not been placed in the queue. The message may include information explaining why the user does not qualify for the queue.

Returning to block 712, if it is determined that the user is qualified for the queue (block 712—YES), the user may be placed in the queue (block 718). For example, queue manager 550 may place the user in the queue and mobile device interface 560 may send a message to user device 110, informing the user that the user has been placed in the queue. Processing may continue at block 730 (FIG. 7C).

FIG. 7B illustrated a second example of how a user may be placed in a queue. In the process of FIG. 7B, mobile device identifier component 220 detects user device 110 in the proximity of mobile device identifier component 220 and contacts user device 110 to determine whether a user, associated with user device 110, would like to be placed in the queue.

The process of FIG. 7B may include detecting a mobile device (block 720). For example, mobile device identifier component 220 may detect that user device 110 is within a particular distance of mobile device identifier component 220. In one example, mobile device identifier component 220 may passively listen for signals sent by user device 110 (e.g., connection maintenance signals and/or connection request signals sent by user device 110 to a base station and/or a WiFi access point). In another example, mobile device identifier component 220 may imitate a signal sent by a base station and/or WiFi access point, may broadcast the imitated signal at periodic intervals, and may determine whether a response is received from user device 110. In yet another example, mobile device identifier component 220 may send a unique signal at periodic intervals and the unique signal may be identified by queue application 510 running on user device 110. Queue application 510 may respond to the received signal by sending information identifying user device 110 to mobile device identifier component 220.

Mobile device identifier component 220 may identify user device 110 in response to detecting user device 110. In one example, user device 110 may be identified based on an identifier associated with connecting user device 110 to network 120, such as an IP address assigned to user device 110 by network 120, an IMSI associated with user device 110, a MIN associated with user device 110, an MSISDN associated with user device 110, a GUTI associated with user device 110, or any other identifier associated with user device 110. In another example, mobile device identifier component 220 may receive a particular identifier from queue application 510. Service provider server 210 may communicate the information identifying user device 110 to queue management system 150 and queue management system 150 may identify a user, associated with user device 110, based on the information identifying user device 110.

The mobile device may be contacted to determine whether a user, associated with the mobile device, wants to be placed in the queue (block 722). For example, service provider server 210 may send a message to user device 110, inquiring whether the user would like to be placed in a queue. For example, if the user enters a Department of Motor Vehicles, service provider server 210, associated with the Department of Motor Vehicles, may send a message to user device 110 stating "Hello. You have just entered the Department of Motor Vehicles. Would you like to be placed in a queue to see a clerk?" Furthermore, if service provider server 210 is associated with more than one queue, the message may include an option to select a particular queue. For example, in the example of the Department of Motor Vehicles, the message sent to user device 110 may include an option to select a vehicle registration queue, a driver's license queue, or a car tax payment queue.

A determination may be made as to whether the user wants to be placed in the queue (block 724). For example, service provider server 210 may receive a response from user device 110 indicating whether the user would like to be placed in the queue (and/or a selection of a particular queue). If it is determined that the user does not want to be placed in the queue (block 724—NO), the user may not be placed in the queue (block 726). For example, service provider server 210 may not place the user in a queue. If it is determined that the user wants to be placed in the queue (block 724—YES), the user may be placed in the queue (block 728). For example, service provider server 210 may place the user in a selected queue. Processing may continue at block 730 (FIG. 7C).

The process of FIG. 7C may include monitoring user and queue status (block 730). For example, queue manager 550 may continue to monitor whether the user meets the qualifications associated with the queue. A determination may be made whether the user is still qualified for the queue (block 735). For example, queue manager 550 may compare a distance, associated with user device 110 and stored in distance field 640 of user record 620 associated with the user, with a distance requirement of the queue and stored in queue qualifications field 612. As another example, queue manager 550 may compare an expected arrival time of the user, stored in expected arrival time field 650 of user record 620 associated with the user, with a maximum expected arrival time stored in queue qualifications field 612.

If it is determined that the user is no longer qualified for the queue (block 735—NO), the user may be removed from the queue (block 740). For example, if queue manager 550 determines that the user has moved too far away from a location associated with the queue, or that the user would take too long to get to the location associated with the queue, queue manager 550 may remove the user from the queue.

The user may be informed that the user has been removed from the queue (block 745). For example, mobile device interface 560 may send a message to user device 110, informing the user that the user has been removed from the queue. The message may include information about why the user has been removed from the queue. In one example, the user may be given an option to be added to another queue of a same type as the queue from which the user has been removed.

Returning to block 735, if it is determined that the user is still qualified for the queue (block 735—YES), an expected arrival time may be determined (block 750). For example, queue manager 550 may compute (or recomputed) the user's expected arrival time and store the information about the user's expected arrival time in expected arrival time field 650 of user record 620 associated with the user. An expected service time may be determined (block 755). For example, service provider interface 570 may receive information from service provider system 130 about when users are serviced and removed from the queue and queue manager 550 may use the received information to determine the expected service time for the user and store the determined information in expected service time field 660.

A determination may be made as to whether the expected arrival time is later than the expected service time (block 760). For example, queue manager 550 may determine whether the user's expected arrival time is later than the user's expected service time. If it is determined that the expected arrival time is later than the expected service time (block 760—YES), the user may be moved down in the queue (block 765). For example, queue manager 550 may move the user down the queue based on the difference. Assume that the expected arrival time of the user is 30 minutes and the expected service time for the user is 20 minutes. Assuming that a person is serviced and removed from the queue every 5 minutes, queue manager 550 may move the user down two positions in the queue in order to avoid having the user's turn come up before the user has reached the location associated with the queue.

The user may be informed that the user has been moved down in the queue (block 770). For example, mobile device interface 560 may send a message to user device 110, informing the user that the user has been moved down the queue because the user would have arrived too late at the location based on the user's previous position in the queue. If it is determined that the expected arrival time is not later than the expected service time (block 760—NO), processing may continue to block 775.

A queue status update may be provided to the user (block 775). For example, mobile device interface 560 may send an updated status message to user device 110 and user device 110 may display the received message. For example, user device 110 may display a message about an estimated wait time, such as a message stating "Your estimated wait time in the queue to get a table at Acme restaurant is now 20 minutes."

Processing may return to block 730. For example, queue manager 550 may continue to monitor to make sure that the user meets the queue qualifications and may continue to provide updates to the user until the user is serviced and removed from the queue (or until the user is removed from the queue based on failing to meet the queue qualifications).

Figure 8:
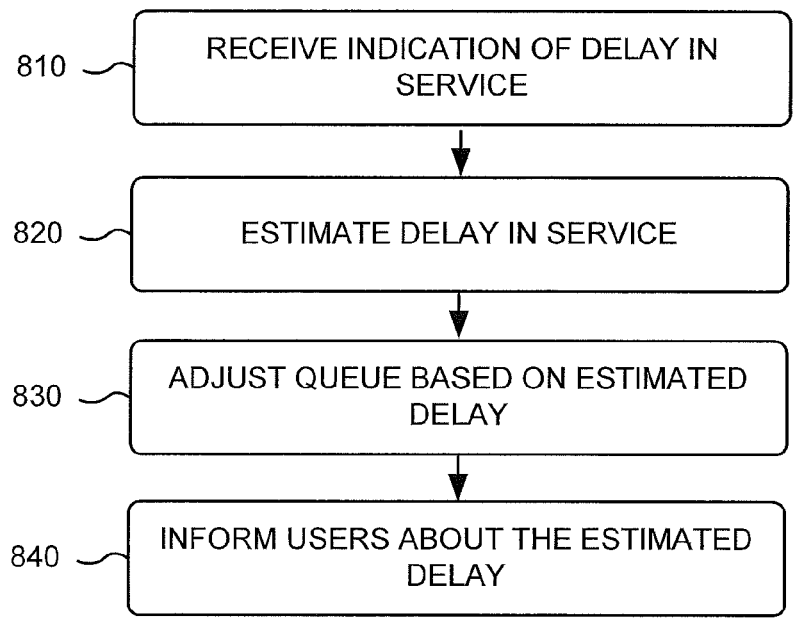
FIG. 8 is a flow diagram illustrating a process for adjusting a queue based on a delay in service according an implementation described herein.

FIG. 8 is a flow diagram illustrating a process for adjusting a queue based on a delay in service according an implementation described herein. In one implementation, the process of FIG. 8 may be performed by queue management system 150 and/or service provider system 130. In other implementations, some or all of the process of FIG. 8 may be performed by another device or a group of devices separate from and/or possibly remote from queue management system 150 and service provider system 130 and/or including queue management system 150 and/or service provider system 130.

The process of FIG. 8 may include receiving an indication of a delay in service (block 810). In one example, service provider system 130 may determine that estimated service times are not accurate. For example, service provider system 130 (and/or queue management system 150) may determine that an estimated service time is later than an actual service time, by at least a threshold amount, for at least a particular number of customers in a queue. In another example, service provider system 130 may receive an indication, from a person associated with service provider system 130, that a delay has occurred. For example, assume a doctor experienced complications during surgery, which may result in delays in the doctor's subsequent appointments. A receptionist may enter this information into service provider system 130 via input device 440. Service provider system 130 may provide the indication of delay to queue management system 150.

A delay in service may be estimated (block 820). In one example, service provider system 130 (and/or queue management system 150) may calculate an estimated delay in service. For example, service provider system 130 may calculate an estimated delay based on differences between estimated service times and actual service times for customers and may average the differences to determine an estimated delay. In another example, service provider system 130 may receive an estimated delay as input, from a person associated with service provider system 130, via input device 440. For example, the receptionist may indicate that the doctor is delayed by one hour.

The queue may be adjusted based on the estimated delay (block 830). In one example, users in a queue, associated with service provider system 130, may be associated with appointment times and service provider system 130 (and/or queue management system 150) may adjust the appointment times based on the estimated delay. In another example, service provider system 130 (and/or queue management system 150) may adjust estimated service times based on the estimated delay.

Users may be informed about the estimated delay (block 840). For example, service provider system 130 (and/or queue management system 150) may send a message to user device 110, informing the user, associated with user device 110, of the estimated delay. Queue application 510 may display a message, via user interface 330, informing the user of the estimated delay. For example, queue application 510 may display a message stating "Your appointment with Dr. Chen has been moved by one hour. Dr. Chen has been delayed during an operation." As another example, queue application 510 may display a message stating "Your estimated wait time for a table at Acme restaurant has been prolonged to 15 minutes due to a delay in service."

Figure 9:
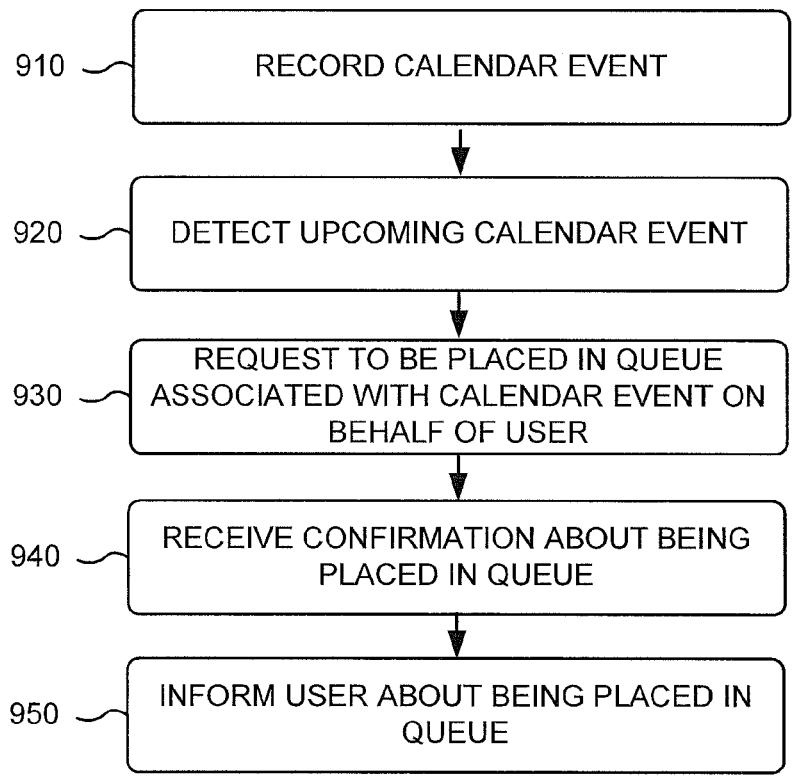
FIG. 9 is a flow diagram illustrating a process for placing a customer in a queue based on a calendar event according to an implementation described herein.

FIG. 9 is a flow diagram illustrating a process for placing a customer in a queue based on a calendar event according to an implementation described herein. In one implementation, the process of FIG. 9 may be performed by user device 110. In other implementations, some or all of the process of FIG. 9 may be performed by another device or a group of devices separate from and/or possibly remote from user device 110 and/or including user device 110.

The process of FIG. 9 may include recording a calendar event (block 910). For example, a user, associated with user device 110, may enter a calendar event via calendar application 520. The calendar event may include information identifying a business, government office, and/or another type of entity associated with a particular queue. For example, the user may enter "Dinner with mom at Acme restaurant" or "Renew vehicle registration."

An upcoming calendar event may be detected (block 920). In one example, when a user enters a calendar event associated with a particular queue, the user may designate that the calendar event is associated with a particular queue. For example, the user may enter "Dinner with mom at Acme restaurant" and may select an option, available in calendar application 520, to associate a queue, associated with Acme restaurant, with the entered calendar event. In another example, queue application 510 may use entity recognition techniques to determine whether a calendar event is associated with a particular queue. For example, queue application 510 may compare text associated with the entered calendar event with a list of entities stored in a memory associated with queue application 510 and/or associated with queue management system 150. In the example of "dinner with mom at Acme restaurant," queue application 510 may send the text to queue management system 150 and may receive, from queue management system 150, an indication that the text matches a queue associated with Acme restaurant.

When a particular calendar event is determined by queue application 510 to be associated with a particular queue, queue application 510 may monitor the calendar event to determine whether the calendar event is an upcoming calendar event. A calendar event may be designated as an upcoming calendar event if the calendar event is scheduled for a time that is within a particular threshold of time with respect to a current time. For example, a calendar event may be designated as an upcoming calendar event if the calendar event is scheduled within a few hours (e.g., 4 hours) of a current time.

A request to be placed in a queue associated with the calendar event may be made on behalf of the user (block 930). In response to detecting an upcoming calendar event that is associated with a particular queue, queue application 510 may send a request to queue management system 150 to place the user in the queue associated with the calendar event. In one example, queue application 510 may send the request at the time of the scheduled calendar event. For example, if the calendar event "dinner with mom at Acme restaurant" is scheduled at 8 pm, queue application 150 may send the request on behalf of the user at 8 pm. In another example, queue application 510 may estimate a wait time associated with the queue and may send the request to be placed in the queue based on the estimated wait time, so that an expected service time, of the user placed in the queue, coincides with the scheduled time. For example, if the calendar event "dinner with mom at Acme restaurant" is scheduled at 8 pm, queue application 510 may request an estimated wait time, for Acme restaurant, from queue management system 150 at 7 pm. Queue management system 150 may determine the estimated wait time based on a time a user is placed in a queue and based on a service time of the user (e.g., when the user is removed from the queue). Assume the estimated wait time is 30 minutes. Since the dinner event is scheduled for 8 pm, queue application 510 may send a request to queue management system 150 at 7:30 pm, in an attempt to ensure that the user gets a table at Acme restaurant at 8 pm.

In one example, queue application 510 may display a query to the user, via output device 450, inquiring whether the user would like to be placed in the queue associated with the calendar event. In another example, queue application 510 may send the request to queue management system 150 without consulting the user.

A confirmation may be received about the user being placed in the queue (block 940). For example, queue management system 150 may send a confirmation to queue application 510, informing queue application 510 that the user has been placed in the queue associated with the calendar event. The user may be informed about being placed in the queue (block 950). For example, queue application 510 may display a message to the user, via output device 450, that the user has been placed in the queue associated with the calendar event.

Queue application 510 may alternatively receive an indication that the user is not qualified to be placed in the queue, if the user does not meet a qualification associated with the queue. For example, similarly to the process described in FIGS. 7A-7C, queue management system 150 may determine whether the user is qualified to be placed in the queue and may send an indication to queue application 510 as to whether the user is qualified to be placed in the queue. Furthermore, queue management system 150 may continue to monitor the user with respect to the queue and may send an indication to queue application 510 if the user does not qualify to remain in the queue. For example, if the user moves too far away from the queue (e.g., farther than a distance specified in queue qualifications field 612 associated with the queue), queue application 510 may receive an indication that the user has been removed from the queue. Furthermore, queue application 510 may receive updates about the user's status in the queue (e.g., an estimated wait time) and/or may receive an indication about an estimated delay associated with the queue.

Figure 10:
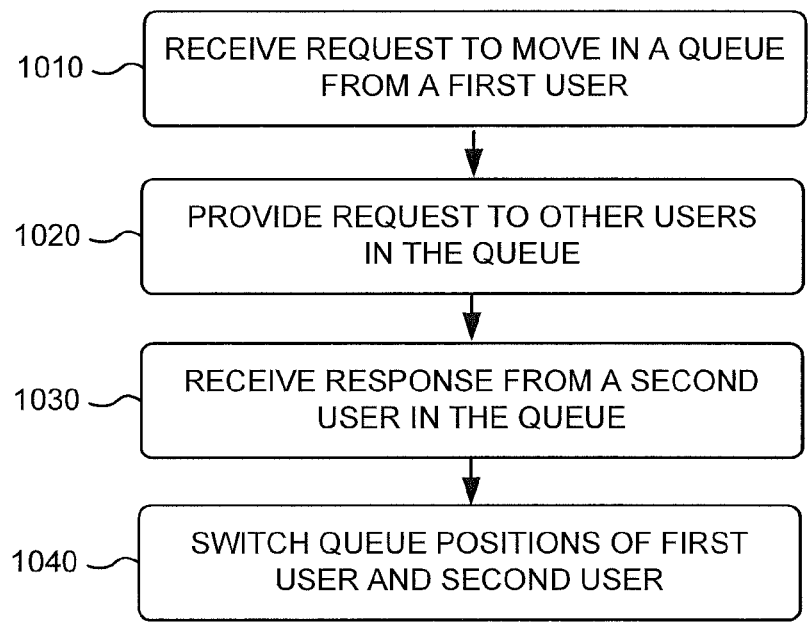
FIG. 10 is a flow diagram illustrating a first process for switching user positions in a queue according an implementation described herein.

FIG. 10 is a flow diagram illustrating a first process for switching user positions in a queue according an implementation described herein. In the example of FIG. 10, two users may voluntarily choose to switch positions in the queue. For example, in a queue to be seated in a restaurant, a first user may have a hungry family and a second user may let the first user move ahead in the queue, by switching positions with the first user. As a second example, the second user may be in queue at a restaurant and may be waiting for someone else, and may realize that if his full party is not present, the second user's party will not be seated. Thus, the second user may offer to trade places with a first user that is behind the second user in the queue, so that the second user does not have to lose his position in the queue if his turn to be seated comes up and his full party is not present to be seated.

In one implementation, the process of FIG. 10 may be performed by queue management system 150. In other implementations, some or all of the process of FIG. 10 may be performed by another device or a group of devices separate from and/or possibly remote from queue management system 150 and/or including queue management system 150.

The process of FIG. 10 may include receiving a request to move in a queue from a first user (block 1010). For example, queue management system 150 may receive a request from a first user to move either up or down in the queue. The request may include a particular message, such as an explanation as to why the first user wants to be moved up or down in the queue.

The request may be provided to other users in the queue (block 1020). For example, queue management system 150 may provide the message from the first user to other users that are ahead or behind in the queue compared with the first user, based on whether the first user wants to move up or down the queue.

A response may be received from a second user in the queue (block 1030). For example, queue management system 150 may receive a response from a second user, indicating that the second user agrees to switch places in the queue with the first user. In one example, if a second user does not want to be bothered with requests from a first user to move up in a queue, the second user may indicate to queue application 510 to ignore requests from other users regarding moving up or down in the queue.

The queue positions of the first user and the second user may be switched (block 1040). For example, if the second user agrees to switch places in the queue with the first user, queue management system 150 may switch the position of the first user in the queue with the position of the second user in the queue.

Figure 11:
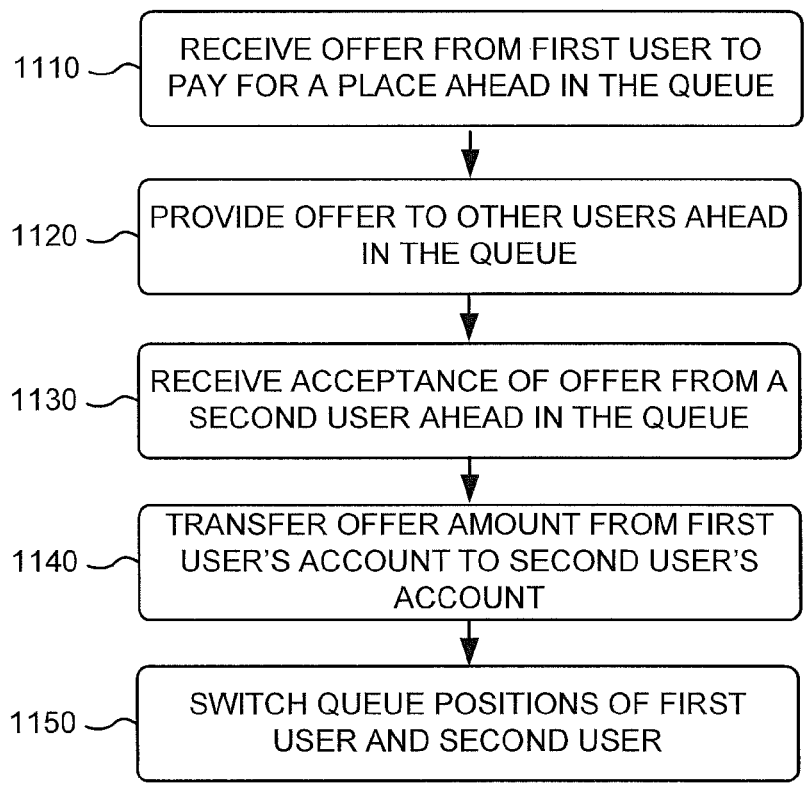
FIG. 11 is a flow diagram illustrating a second process for switching user positions in a queue according an implementation described herein.

FIG. 11 is a flow diagram illustrating a second process for switching user positions in a queue according an implementation described herein. In one implementation, the process of FIG. 11 may be performed by queue management system 150. In other implementations, some or all of the process of FIG. 11 may be performed by another device or a group of devices separate from and/or possibly remote from queue management system 150 and/or including queue management system 150.

The process of FIG. 11 may include receiving an offer from a first user to pay for a place ahead in the queue (block 1110). For example, the first user may send a request, via queue application 510, to queue management system 150, indicating that the first user would like to move up in the queue, along with an offer to pay a particular amount to another user that is willing to switch places in the queue with the first user. For example, the first user may send a message stating "My family is hungry. I will pay $5 to move up in the queue." The offer may include information identifying the first user.

The offer may be provided to other users ahead in the queue (block 1120). For example, queue management system 150 may send the message from the first user to other users that are ahead in the queue. Queue applications 150, associated with the other users that are ahead in the queue, may display the message from the first user in user devices 110 associated with the other users. The displayed message may include an option to accept the offer and an option to ignore the offer.

An acceptance of the offer may be received from a second user ahead in the queue (block 1130). For example, a second user may accept the offer from the first user. The second user may select to accept the offer from the first user and queue application 510, associated with user device 110 of the second user, may send the selection to queue management system 150. The first user may be prompted by queue management system 150 to determine whether the first user would like to switch positions with the second user. For example, if the second user is only a few places ahead of the first user in the queue, the first user may not find it worthwhile to pay to switch positions with the second user, and may not agree to switch positions with the second user.

The offer amount may be transferred from the first user's account to the second user's account (block 1140). Queue management system 150 may receive an indication of the second user's acceptance of the first user's offer. The indication may include information identifying the second user. Queue management system 150 may send information identifying the first user, information identifying the second user, and the amount of the offer to billing system 140. Billing system 140 may use the information received from queue management system 150 to identify a first account associated with the first user and a second account associated with the second user and may transfer the amount of the offer from the first account to the second account. Billing system 140 may send a message to a first user device 110, associated with the first user, and a message to a second user device 110, associated with the second user, indicating that the amount of the offer has been transferred from the first account to the second account.

The queue positions of the first user and the second user may be switched (block 1050). For example, queue management system 150 may switch positions of the first user and the second user in the queue. For example, if the second user was second in line to be served in the queue and the first user was the seventh in line to be served in the queue, after switching positions of the first user and the second user, the second user may be seventh in line to be served in the queue and the first user may be second in line to be served in the queue.

Figure 12A:
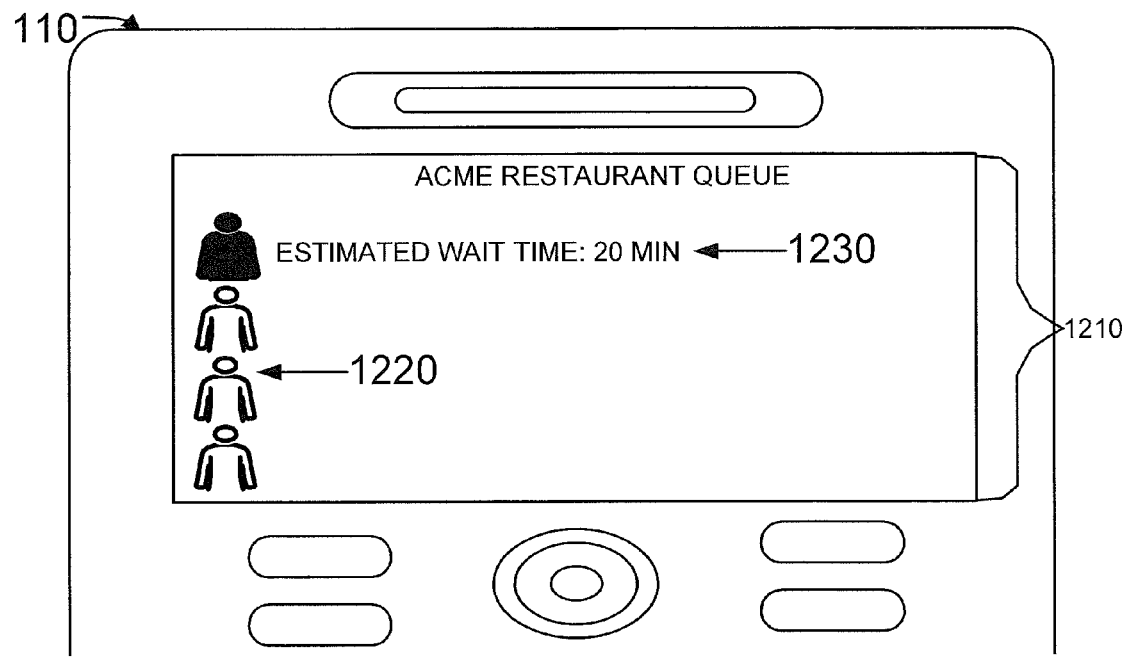
FIG. 12A is a diagram of a first example user interface according an implementation described herein.

FIG. 12A is a diagram of a first example user interface 1210 according an implementation described herein. As shown in FIG. 12A, user interface 1210 may include a queue depiction 1220 and a queue update message 1230. Queue depiction 1220 may include information about how many people are ahead of the user in the queue. For example, user interface 1210 depicts three people ahead of the user. Queue update message 1230 may include information about the user's status in the queue, such as, for example, an expected service time. For example, user interface 1210 depicts that the user has an estimated wait time of 20 minutes before being served.

Although FIG. 12A shows example items that may be included in user interface 1210, in other implementations, user interface 1210 may include fewer items, different items, differently arranged items, and/or additional items than depicted in FIG. 12A.

Figure 12B:
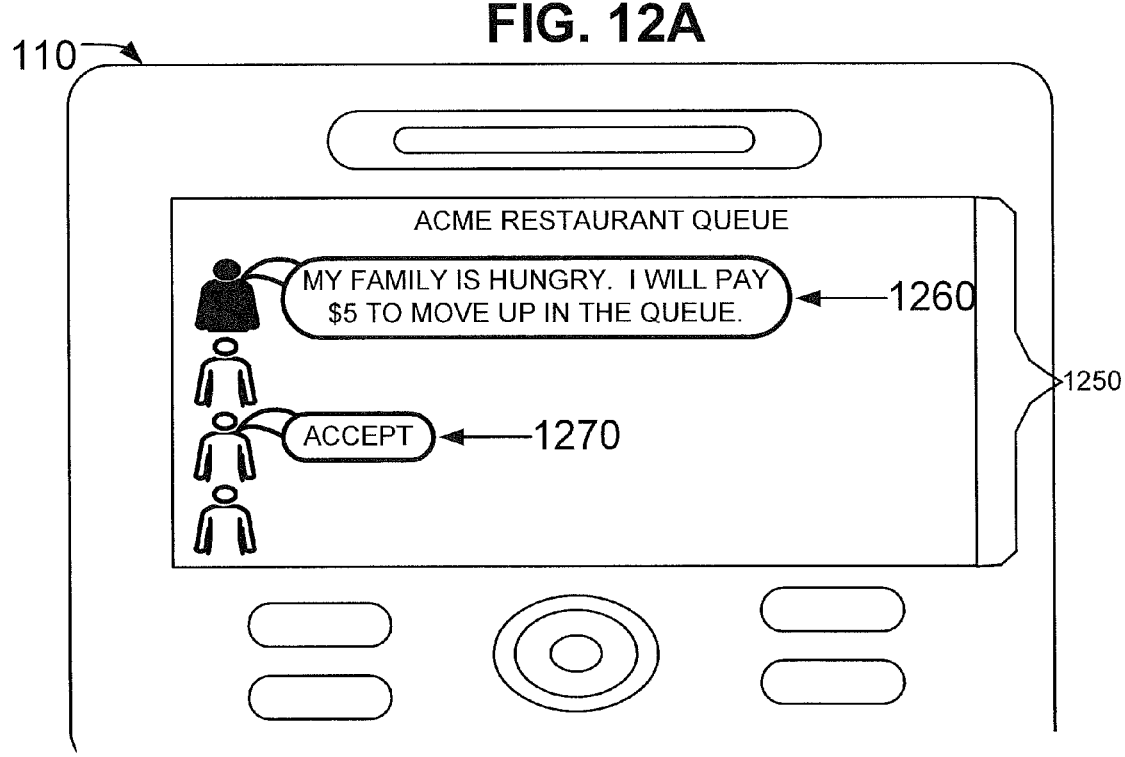
FIG. 12B is a diagram of a second example user interface according an implementation described herein.

FIG. 12B is a diagram of a second example user interface 1250 according an implementation described herein. As shown in FIG. 12B, user interface 1250 may include a first message 1260 and a second message 1270. First message 1260 may include an offer from a first user to pay a particular amount to move up in the queue. First message 1260 may be sent, by queue management system 150, to be displayed to user devices 110 associated with users that are ahead in the queue. Since FIG. 12B shows three users ahead of the first user in the queue, first message 1260 may be displayed to the three users that are ahead in the queue. Second message 1270 may include an acceptance of the first user's offer by a second user. Second message 1270 may be sent by queue management system 150 to be displayed to user device 110 associated with the first user.

Although FIG. 12B shows example items that may be included in user interface 1250, in other implementations, user interface 1250 may include fewer items, different items, differently arranged items, and/or additional items than depicted in FIG. 12B.

The foregoing description of implementations, described above, provides illustration and description, but is not intended to be exhaustive or to limit the invention to the precise form disclosed. Modifications and variations are possible in light of the above teachings or may be acquired from practice of the invention.

For example, queue management system 150 may be used in connection with a telephone queue. Assume a user needs to talk to a customer representative of a particular company on the phone. Often, the user may need to maneuver through an automated system before being put on hold until a customer representative is available. Rather than having to wait on the phone, the user may send a request, via queue application 510, to queue management system 150 to be put in a telephone queue associated with a particular telephone number. Queue management system 150 may dial the telephone number and place the user in a queue to speak with a customer representative. When a customer representative answers the call, queue management 150 may play a short automated message, informing the customer representative that the user is being notified. Queue management system 150 may then call the first user back by dialing a number associated with user device 110, and may conference the user with the customer representative. This may eliminate time that the user may otherwise have to spend being on hold and waiting on the phone.

While series of blocks have been described with regard to FIGS. 7A-7C, 8, 9, 10, and 11, the order of the blocks may be modified in other implementations. Further, non-dependent blocks may be performed in parallel.

Also, certain portions of the implementations may have been described as a "component," "application," "interface," or "manager" that performs one or more functions. The terms "component," "application," "interface," and "manager" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
   receiving, by the server device, a request from a user device to place a user, associated with the user device, in a queue;
   determining, by the server device, whether the user meets one or more qualifications associated with the queue, wherein the one or more qualifications include that the user remains within a particular distance of a location associated with the queue;
   placing, by the server device, the user in the queue, when the user meets the one or more qualifications;
   monitoring, by the server device, whether the user continues to meet the one or more qualifications, while the user is in the queue; and
   removing, by the server device, the user from the queue, when the user fails to meet the one or more qualifications.

2. The method of claim 1, where the one or more qualifications further include at least one of:
   that the user is not in another queue at a same time as a time associated with the request,
   that the user's estimated arrival time at the location associated with the queue is less than a threshold time, or
   that the user has an appointment, a membership, or an account associated with the queue.

3. The method of claim 1, further comprising:
   providing, to the user device, an update about the user's status in the queue.

4. The method of claim 3, wherein the update includes an estimated wait time for the user.

5. The method of claim 1, further comprising:
   determining an expected arrival time for the user to a location associated with the queue;
   determining an expected service time for the user;
   determining whether the expected arrival time is later than the expected service time; and
   moving the user down the queue when the expected arrival time is later than the expected service time.

6. The method of claim 1, further comprising:
   receiving an indication of delay associated with the queue;
   adjusting an appointment time associated with the user, based on the received indication; and
   informing the user about the delay and the adjusted appointment time.

7. The method of claim 1, further comprising:
   receiving a request from the user to move up or down the queue;
   transmitting the request to other users in the queue;
   receiving a response from another user in the queue, the response indicating that the other user would like to switch positions with the user; and
   switching a first position in the queue associated with the user with a second position in the queue associated with the other user, based on the received response.

8. The method of claim 1, further comprising:
   receiving a request from the user to move up the queue, the request including an offer of a particular amount that the user is willing to pay to move up the queue;
   transmitting the request to other users that are ahead of the user in the queue;
   receiving a response from another user, ahead of the user in the queue, the response indicating that the other user accepts the user's offer;
   informing a billing system that the particular amount should be transferred from an account associated with the user to an account associated with the other user, based on the received response; and
   switching a first position in the queue associated with the user with a second position in the queue associated with the other user, based on the received response.

9. A system comprising:
   a processor configured to:
      detect that a mobile communication device is within a particular distance of the processor;
      contact the mobile communication device to determine whether a user associated with the mobile communication device wants to be placed in a queue associated with the system; and
      receive an indication from the mobile communication device that the user wants to be placed in the queue; and
   a server device configured to:
      receive the indication from the mobile device identifier component;
      place the user in the queue in response to receiving the indication;
      monitor whether the user continues to meet one or more qualifications associated with the queue, while the user is in the queue, wherein the one or more qualifications include that the mobile communication device remains within the particular distance of the processor; and
      remove the user from the queue, when the user fails to meet the one or more qualifications.

10. The system of claim 9, where the server device is further configured to:
    provide, to the mobile communication device, an update about the user's status in the queue.

11. The system of claim 10, wherein the update includes an estimated wait time for the user.

12. The system of claim 9, wherein the server device is further configured to:
    determine an expected arrival time for the user to a location associated with the queue;
    determine an expected service time for the user;
    determine whether the expected arrival time is later than the expected service time; and
    move the user down the queue when the expected arrival time is later than the expected service time.

13. The system of claim 9, wherein the server device is further configured to:
    receive an indication of delay associated with the queue;
    adjust an estimated wait time associated with the user, based on the received indication; and
    inform the user about the delay and the adjusted estimated wait time.

14. The system of claim 9, wherein the server device is further configured to:
    receive a request from the user to move up or down the queue;
    provide the request to other users in the queue;
    receive a response from another user in the queue, the response indicating that the other user would like to switch positions with the user; and switch a first position in the queue associated with the user with a second position in the queue associated with the other user, based on the received response.

15. The system of claim 9, wherein the server device is further configured to:
  receive a request from the user to move up the queue, the request including an offer of a particular amount that the user is willing to pay to move up the queue;
  provide the request to other users that are ahead of the user in the queue;
  receive a response from another user, ahead of the user in the queue, the response indicating that the other user accepts the user's offer;
  inform a billing system that the particular amount should be transferred from an account associated with the user to an account associated with the other user, based on the received response; and
  switch a first position in the queue associated with the user with a second position in the queue associated with the other user, based on the received response.

16. A mobile communication device comprising:
  a memory to store instructions; and
  a processor configured to execute the instructions to:
   record a calendar event via a calendar application;
   determine that the recorded calendar event is associated with a queue;
   determine that the recorded calendar event is scheduled for a time that is within a particular period of time with respect to a current time;
   send a request to a queue management system to place a user, associated with the mobile communication device, in the queue associated with the recorded calendar event, based on determining that the recorded calendar event is scheduled for the time that is within the particular period of time with respect to the current time;
   receive an indication from the queue management system as to whether the user meets one or more qualifications associated with the queue, wherein the one or more qualifications include that the user remains within a particular distance of a location associated with the queue;
   receive a confirmation from the queue management system that the user has been placed in the queue, when the user meets the one or more qualifications; and
   receive an indication from the queue management system that the user has not been placed in the queue, or that the user has been removed from the queue, when the user fails to meet the one or more qualifications.

17. The mobile communication device of claim 16, where the processor is further configured to determine that the recorded calendar event is associated with a queue based on receiving an indication from the user, via an input device associated with the mobile communication device, that the queue is associated with the recorded calendar event.

18. The mobile communication device of claim 16, where the processor is further configured to determine that the recorded calendar event is associated with a queue based on:
  providing text associated with the recorded calendar event to the queue management system; and
  receiving, from the queue management system, an indication that the queue is associated with the recorded calendar event based on the provided text.

\* \* \* \* \*